Aug. 18, 1931. H. K. TYNDALL 1,819,577
METHOD OF AND APPARATUS FOR PRECIPITATING DRIFT OR SHEET SALT
Filed Feb. 1, 1928
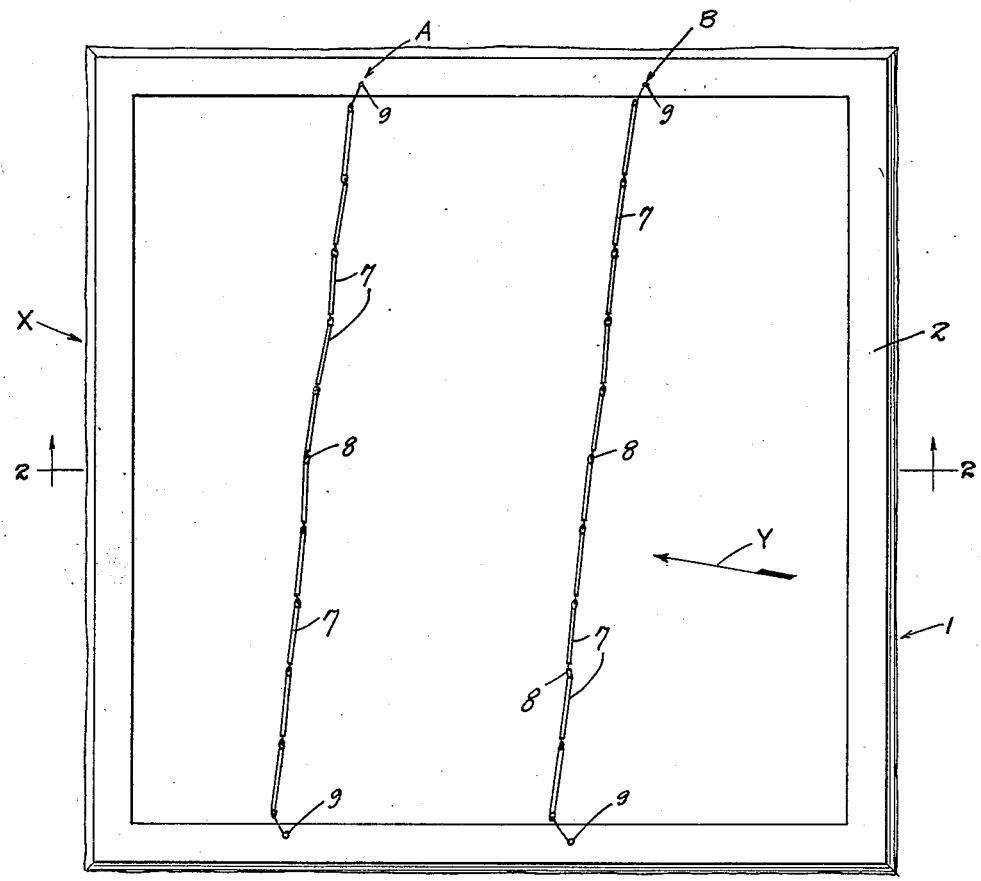
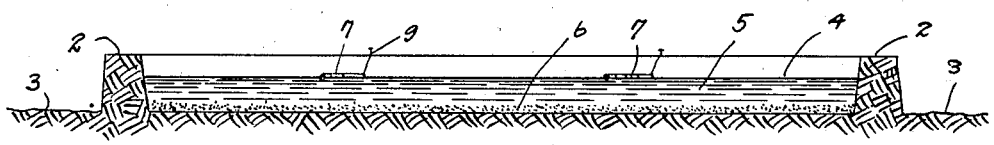
Inventor
HATTIE K. TYNDALL
By
Attorneys Patented Aug. 18, 1931

1,819,577

UNITED STATES PATENT OFFICE

HATTIE K. TYNDALL, OF SAN LEANDRO, CALIFORNIA

METHOD OF AND APPARATUS FOR PRECIPITATING DRIFT OR SHEET SALT

Application filed February 1, 1928. Serial No. 251,105.

My invention relates to improvements in method of precipitating drift or sheet salt, and it consists in the combinations, constructions and arrangements hereinafter described and claimed and in the steps hereinafter set forth.

The production of salt by the solar evaporation method is as follows: Salt water or brine is conveyed from a natural salt water source such as the ocean, gulf, bay inlet or other natural or artificial body of water into a series of ponds. These ponds may be enclosed by wall constructions of any material desired. Oftentimes they are mere depressions in an area of land lying adjacent to the body of water. Other times they are a series of frameworks constituting walls that separate a large area into a number of smaller areas.

The area used for obtaining the salt is divided into evaporating ponds, lakes, or vats which comprises approximately 90% of the area. The brine is pumped or conveyed by gravity from pond to pond, and in each pond it is evaporated for a certain length of time until when the final pond is reached, the brine is practically at saturation point.

When this point is reached, the brine is ready for the second process normally termed the crystalizing process. My invention pertains to this process. The method now employed is to convey the brine into vats or crystallizers which comprise approximately 1/10 of the total area and to pour a sufficient quantity of brine into the vats to have it cover the required area and to be of a sufficient predetermined depth. As evaporation takes place, more of the saturated brine is conveyed into the vat in order to maintain a sufficient brine depth at all times as the salt precipitates and crystallizes in accordance with the evaporation.

In the crystalizing vats, a large quantity of very fine or what is commonly known as drift salt invariable forms at certain points in the vat, generally along the levees or sides of the vat where it piles up due to the wind action. This drift salt is undesirable.

The cause for this drift salt forming is that during a portion of the evaporating season there are periods, especially before 12:00 noon of each day, when there is no wind action. During this period if the specific gravity of the brine is ideal for evaporation, the salt forms on the surface, frequently in large thin sheets. Later in the day when the wind action commences, this sheet of drift salt is moved toward one of the levees or bulkheads and precipitates in fine crystals of an undesirable size from a harvesting standpoint. This drift salt does not occur for the balance of the day because the wind agitates the surface of the water sufficiently to precipitate the salt evenly throughout the crystalizing area.

The principal object of my invention is to provide a method and means for preventing this drift salt from piling up adjacent to one of the levees and from forming crystals of an undesired size.

Other objects and advantages will appear in the following specification, and the novel features of my invention will be particularly pointed out in what I hereinafter claim.

My invention is illustrated in the accompanying drawings forming a part of this application, in which Figure 1 is a plan view of a vat, and Figure 2 is a section along the line 2—2 of Figure 1.

In carrying out my invention, I provide a vat indicated generally at 1. This vat may be of any shape desired, and the walls 2 thereof may be formed from any material that will retain water. I have shown the vat as being square, and have further shown in Figure 2 the walls as being formed from the ground 3.

The saturated brine is poured into this vat by any method not shown, and the brine is replenished from time to time according to the amount of evaporation taking place. The replenishing is done in order to keep the level 4 of the brine 5 at approximately the same height at all times.

As already stated, the agitation of the surface of the water by wind or other means will cause the crystals of salt to be precipitated from the brine and to fall to the bottom of the vat as at 6. It is during the still period of the day when there is little or no wind action that the crystals form upon the surface 4 and form what is known as drift salt. I prevent this drift salt from moving toward the side X when the wind action indicated by the arrow Y in Figure 1 again starts. I accomplish this by providing a system of floats that are strung across the surface of the liquid at various points as at A and B. These floats may consist of bamboo or other buoyant material of a length and thickness suitable for the occasion. In order to permit the easy handling of the floats, I preferably make them of a length from 5 to 10 feet, and I join them together at each end with any suitable flexible material such as wire, rope, etc. These floats 7 in the present form of the device are connected together by links 8, and the ends of the units A and B are secured to the sides of the tank at 9.

If, now, the drift salt forms upon the surface of the water and subsequently the wind action commences, the floats will prevent the sheets of drift salt from coming into contact with the side X. Instead, the salt will come in contact with the floats and will be broken up and precipitated at different points throughout the area of the vat. It is obvious that the shore fastenings 9 may be moved in order that the drift salt may be precipitated at predetermined points. The device is extremely simple in construction, and provides a novel method of overcoming the disadvantages set forth in the first part of the specification.

Although I have shown and described one embodiment of my invention, it is to be understood that the same is susceptible of various changes, and I reserve the right to employ such changes as may come within the scope of the invention as claimed.

I claim:

1. The method of evenly settling salt crystals from a body of brine which consists in stopping the surface movement of the precipitated crystals at short intervals and in settling the crystals.

2. A device for settling precipitated salt crystals comprising a retaining means for brine and obstructing means being disposed in predetermined positions and extending across the entire surface of the body of brine, the obstructing means being disposed in substantially parallel rows.

3. A device for settling precipitated salt crystals comprising floatable obstructing means arranged in substantially parallel rows and extending across the surface of the brine, said obstructing means continuously resting upon the surface of the brine while crystallizing a commercial percentage of salt from the brine.

4. A device for settling precipitated salt crystals comprising substantially parallel rows of floatable obstructing means disposed on the surface of the brine, each row consisting of floating members linked together, said obstructing means continuously resting upon the surface of the brine while crystallizing a commercial percentage of salt from the brine.

HATTIE K. TYNDALL.